(12) United States Patent
Alfors et al.

(10) Patent No.: US 7,245,122 B2
(45) Date of Patent: Jul. 17, 2007

(54) VANE ACTUATED MAGNETIC DRIVE MODE SENSOR

(75) Inventors: Eugene D. Alfors, Rockford, IL (US); Kenneth L. Eichholz, Freeport, IL (US); Lawrence E. Frazee, Freeport, IL (US); John S. Patin, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/315,924

(22) Filed: Dec. 21, 2005

(65) Prior Publication Data
US 2007/0139038 A1    Jun. 21, 2007

(51) Int. Cl.
*G01B 7/14* (2006.01)
*G01R 33/07* (2006.01)
(52) U.S. Cl. ............... 324/207.2; 324/251; 324/207.24
(58) Field of Classification Search ............. 324/207.2, 324/251, 207.24
See application file for complete search history.

(56) References Cited
U.S. PATENT DOCUMENTS

| 4,651,066 A | 3/1987 | Gritter et al. ............... 318/139 |
| 5,191,178 A | 3/1993 | Baker ....................... 200/61.88 |
| 5,338,907 A | 8/1994 | Baker et al. ............. 200/61.88 |
| 5,588,202 A | 12/1996 | Ehlers et al. ................. 29/606 |
| 5,628,639 A | 5/1997 | Eichholz, Jr. et al. ........ 439/79 |
| 5,648,719 A | 7/1997 | Christensen et al. ... 324/207.26 |
| 5,915,286 A | 6/1999 | Figi et al. ................. 73/865.9 |
| 5,991,678 A | 11/1999 | Gil .............................. 701/51 |
| 6,389,661 B1 * | 5/2002 | Brown et al. .................. 24/633 |
| 2003/0201407 A1 | 10/2003 | Atherton et al. ....... 250/559.13 |
| 2004/0135089 A1 | 7/2004 | Manz et al. ................ 250/343 |

OTHER PUBLICATIONS

*Sensors*, Tyco Electronics, Catalog 1773105, pp. 19-1-19-10.

* cited by examiner

*Primary Examiner*—Reena Aurora
(74) *Attorney, Agent, or Firm*—Kermit D. Lopez; Luis M. Ortiz

(57) ABSTRACT

A vane actuated drive mode sensor is generally composed of two primary components, including a drive mode sensor array and an actuator. The sensor array can be provided as a housing composed of a plurality of Hall Effect (HE) sensors, magnets and the electronics associated with the sensors. The actuator, also referred to as a vane, can be provided as a plate constructed from a magnetic material, such as, for example, ferrous steel, and can be provided with holes punched thereon at different places depending on the requirement of a user. The actuator can be connected to a user's driver and can slide on and/or within the housing.

20 Claims, 6 Drawing Sheets

VANE ACTUATED MAGNETIC DRIVE MODE SENSOR

TECHNICAL FIELD

Embodiments are generally related to sensing devices and components thereof. Embodiments are also related to drive mode sensors and automotive applications.

BACKGROUND OF THE INVENTION

Drive mode sensors are utilized in a variety of sensing applications, such as, automatic transmission, and measuring drive mode. Such devices are typically utilized to convey the desired transmission gear position to the transmission control unit (TCU) (i.e. P-R-N-D-5-4 . . . ) in automotive application.

Various methods and systems are currently employed to accomplish this task, including mechanical and magnetic solutions. Magnetoresistive (MR) sensors, for example, are particularly beneficial for engine compartment (e.g., camshaft and crankshaft position sensing) and powertrain applications (e.g., transmission and transfer case gear speed sensing).

As vehicles become more complex, however, the controller requires more supportive information, such as, for example, information that instructs the TCU that the gearshift is between two positions (i.e. between reverse and neutral). Complex sensor-target (i.e., actuator) arrangements have also been devised to ensure that the vehicle will not start unless the sensor indicates that the vehicle is in park or neutral. Such devices also ensure that the TCU is not dependent simply upon one sensor signal.

U.S. Pat. No. 5,915,286, entitled "Safety Restraint Sensor System," which issued to Bruce Figi, et al on Jun. 22, 2005 discloses an example of a safety restraint sensor application. U.S. Pat. No. 5,915,286, which is assigned to Honeywell International Inc. and is incorporated herein by reference, generally includes a safety restraint sensor system for detecting a latched position and/or an unlatched position of a latch and a buckle. A vane projects from the latch that is movably mounted with respect to the housing. A magnet and a Hall element are mounted with respect to the housing. When the buckle engages the latch, the vane and the buckle move within the magnetic field of the magnet. The magnetic field is distributed through the Hall element by way of the buckle and the vane. The Hall element sends a signal indicating the latched position to an appropriate receptor such as a safety restraint.

Other devices rely on magnetic angle attack configurations, such as, for example, a magnetic angle of attack sensor. Such a device typically includes a rotating vane that is sensitive to airflow direction mounted on a rotary shaft that is mounted on the housing. The housing can be supported on an aircraft, and includes a non-contact magnetic sensing assembly for sensing the rotation of the shaft relative to the housing.

The prior art suggests that an actuator consisting of an encoded magnet is a standard solution. The encoded magnet driven by the transmission manual valve has 4 magnetized 'tracks', each of which slides over a Hall sensor. The output of the TCU is a 4-bit code in which each position is indicated by a different code. Thus, only one sensor switches states with any magnet positional change and the system is not reliant on a single output.

The problem with Hall sensor/encoded magnet solutions, however, is two fold. First, desired accuracies are difficult to achieve (accuracy is 'linear switch point accuracy'). Tolerances must be tightly held not only within the encoded magnetization pattern, but they also need to be held tightly regarding the magnet size, shape, the senor housing size and shape, and the placement of the Hall effect (HE) sensor. Second, the cost of such a solution is high due to the difficult nature of holding tolerances and the large size of the magnet required. A point to note is that mechanical solutions are not considered as the designs typically wear; reliability is considered superior in the electronic/magnetic solutions.

Variable reluctance (VR) sensors offer low cost, do not require power, and are easy to connect to the ECU (electronic control unit), but the amplitude of its output signal is proportional to rotational speed, thus making it inaccurate at low speeds and/or high noise. While, the differential magnetic comparator (DMC) configuration, which uses two closely spaced HE sensors and compares the difference in the signals allows for detecting zero speed (which cannot be detected using single Hall sensors) are relatively more costly.

The magnetoresistive (MR) sensors use a sophisticated mirrored target, a ferromagnetic disc with two tracks. The resulting signal, which is a large signal, can be used to accurately detect position and speed (including zero speed) with repeatability, and good tolerance for mechanical variation. However, mirrored targets are relatively more expensive than gear or vane sensor/target configurations.

Hence, there is an apparent need for an inexpensive and easily manufactured drive mode sensor system to address the aforementioned problems effectively.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, an object of the present invention to provide for a magnetic sensor solution that is both accurate and cost effective.

The aforementioned aspects of the invention and other objectives and advantages can now be achieved as described herein. An improved sensing device is disclosed herein that includes a sensor array and an actuator. The sensor array includes a housing, magnets, one or more Hall Effect (HE) sensors and associated electronic components. The housing can be configured from a non-magnetic material such as thermoplastic to house one or more magnets, one or more HE sensors and associated electronics. Such a device can be configured with grooves that allow the actuator to slide within or thereon. The housing can be provided with bushings to attach it to a customer's device.

The HE sensor array comprises one or more HE sensors. Magnets may be provided on and/or within the housing in order to bias such HE sensors and to provide a magnetic field for sensor actuation. The HE sensors sense the magnetic field provided by the magnets to detect the position of the actuator within the housing. A user may make contact to a terminal or connector on the sensor array.

The actuator can be constructed from, for example, ferrous steel and can slide on the grooves within the housing. The actuator can be encoded with a printed pattern and/or slots punched thereon. The actuator can also be over-molded to restrict ferrous particles from entering the punched pattern/slots.

In an alternate embodiment, a low-grade magnetic material with a specific polarity can replace the magnets and can be attached to the back of the actuator. This is a more cost effective solution, as the magnets need not be separately engulfed in the housing. The actuator can be over-molded in such a case also in order to ensure more accurate output.

In another aspect, the actuator may slide externally within a fixed linear pattern within the housing and the actuator may be provided with an attachment component for attaching it to the customer's actuator driver.

In a further aspect, the housing, actuator, and Hall Effect sensors are arranged with respect one another to provide a vane actuated sensor apparatus.

In the working condition, the actuator driver drives the actuator, which slides on the grooves present on/within the housing. In such a scenario, the actuator can move between the sensors and the magnets. The actuator can be made of a nonmagnetic material that blocks the magnetic flux such that one or more sensors may then move into an inactive state, thereby generating an output that changes with the actuator position. The encoded punched pattern/slots on the actuator dictate the output of the sensors. The actuator is also over-molded to restrict ferrous particles from entering the punched pattern/slots to avoid erroneous output.

The two problems encountered in the prior art, accuracy and/or high cost, are eliminated by using a vane sensor approach as indicated herein. The current solution provides a good combination of accuracy and cost.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The vane actuated drive mode sensor depicted herein can be composed of two major parts, including a drive mode sensor array and an actuator. The sensor array can be provided in a housing composed of a plurality of Hall Effect (HE) sensors, magnets and the electronics associated with the sensors. The actuator, also referred to as a vane, can be provided as a plate constructed from a magnetic material, such as, for example, ferrous steel, and can be provided with holes punched thereon at different places depending on the requirement of a user. The actuator can be connected to a user's driver and can slide on and/or within the housing. The exact description and working of the vane actuated drive mode sensor is explained in greater detail with respect to the various embodiments described below.

Figure 1:
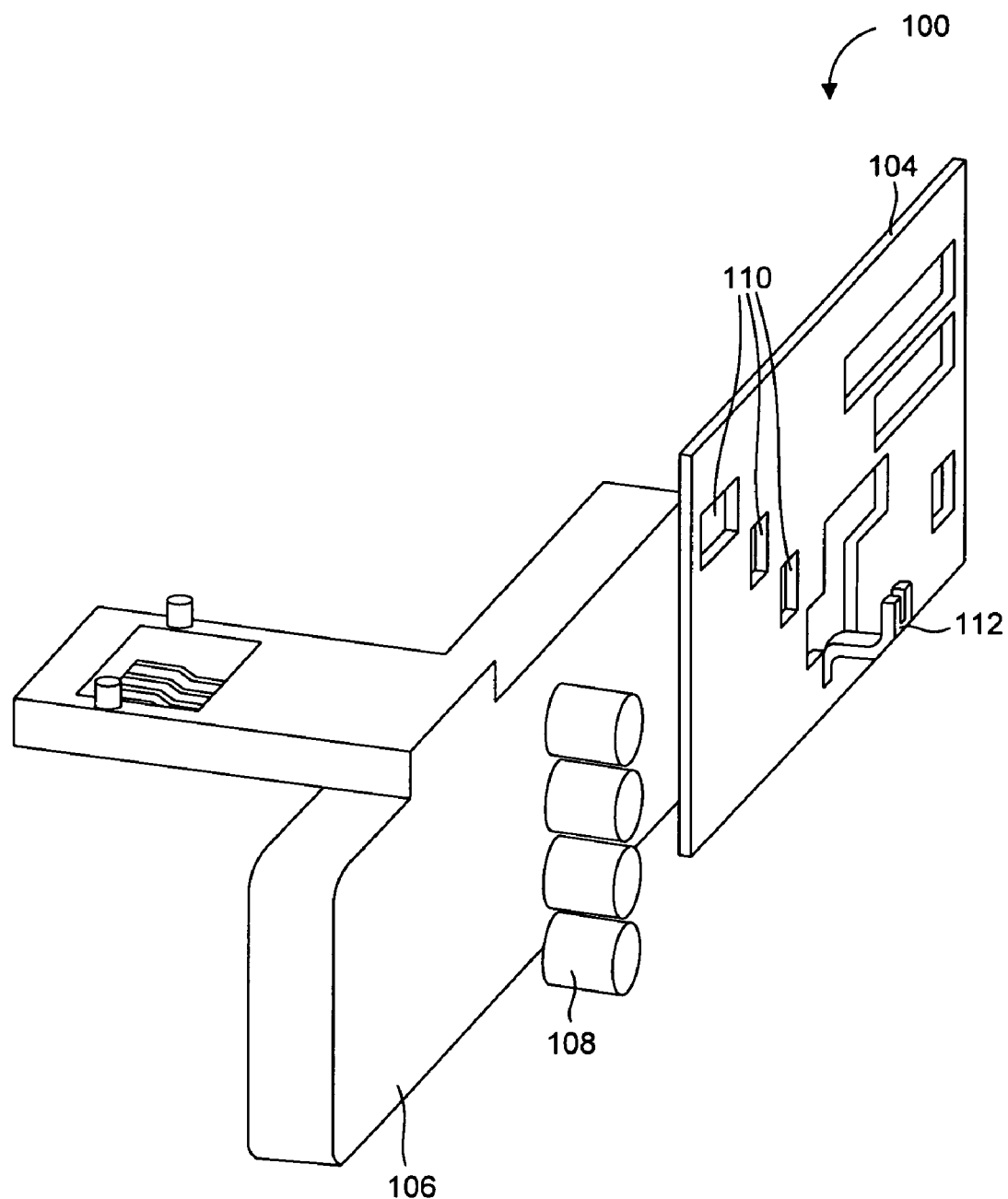
FIG. 1 illustrates a perspective view of a vane actuated magnetic drive mode sensor, according to an embodiment of the invention.

FIG. 1 illustrates a perspective view of a vane actuated magnetic drive mode sensor 100, according to one embodiment. The vane actuated magnetic drive mode sensor 100 includes a drive mode sensor array 102 and an actuator 104. The drive mode sensor array 102 includes a housing 106 made of thermoplastic material and at least one magnet 108. Hall Effect sensors and supporting electronics can be also enclosed within the housing 106. The magnets 108 depicted in FIG. 1 are shown to be in free space to provide the magnetic field required for actuation of the sensor 100.

The actuator 104 can be provided as a stamped ferrous target with an encoded pattern 110 punched thereon. The ferrous target may be provided with an attachment component 112 to attach to the customer's actuator driver. The user may make contact with the terminals or a connector on the drive mode sensor array 102. Additionally, the actuator 104 can be over-molded so that ferrous particles do not enter the punched slots/patterns 110 and/or so that the attachment component 112 to the user's actuator driver can be more detailed at least as compared to that offered by stamping techniques. Depending upon the implemented embodiment and design consideration, magnet(s) 108 is shown in FIG. 1 in free space and may be attached on/within the housing 106 for actuation of the vane actuated magnetic drive mode sensor 100.

Figure 2:
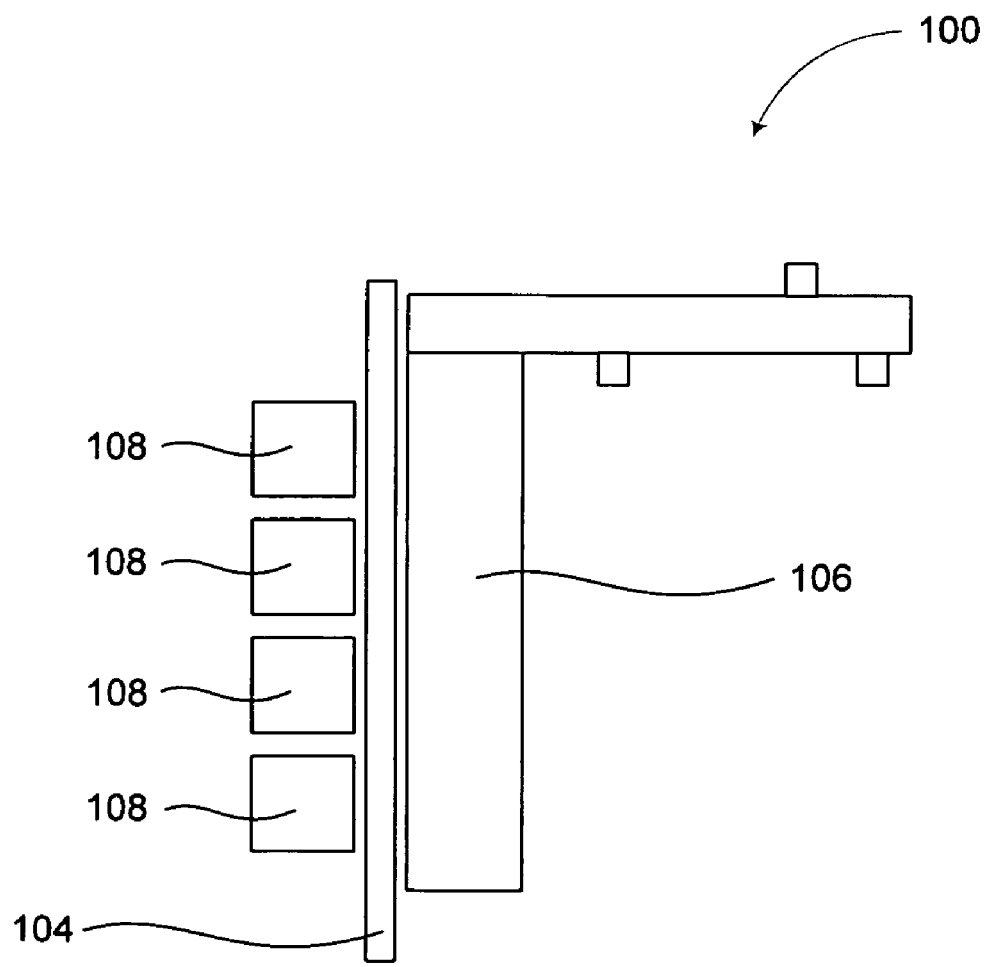
FIG. 2 illustrates a side view of the vane actuated magnetic drive mode sensor depicted in FIG. 1, according to an embodiment of the invention.

FIG. 2 illustrates a side view of the vane actuated magnetic drive mode sensor 100 of FIG. 1. The configuration depicted in FIG. 2 indicates that the vane 104 can slide between the housing 106 and at least one magnet 108 of the drive mode sensor array 102.

Figure 3:
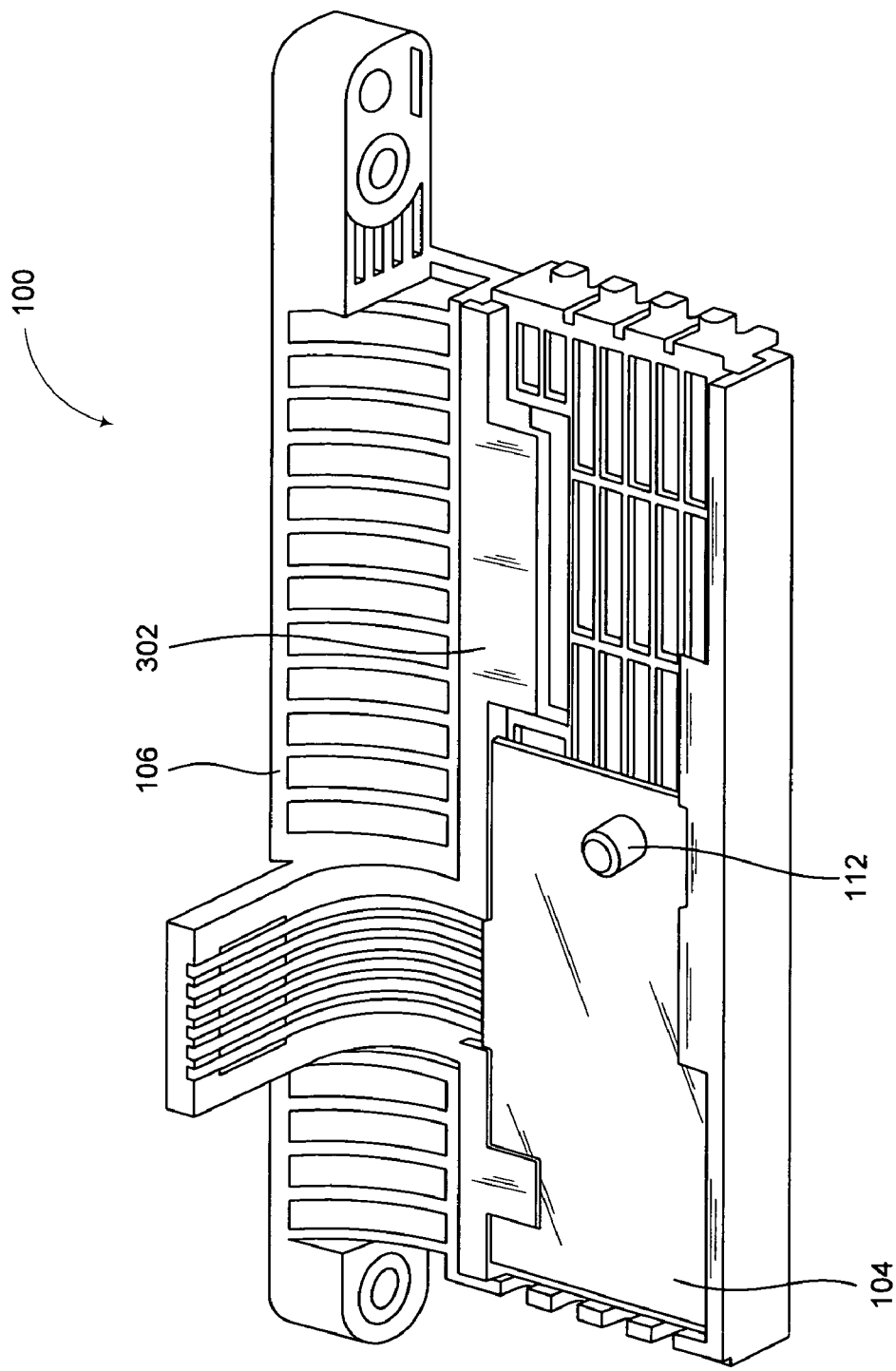
FIG. 3 illustrates a perspective view of the vane actuated magnetic drive mode sensor, in accordance with the preferred embodiment.

FIG. 3 illustrates a perspective view of a vane actuated magnetic drive mode sensor 100, in accordance with a preferred embodiment. The drive mode sensor 100 comprises a drive mode sensor array 102 and an actuator 104. The drive mode sensor array 102 consists of a housing 106 that includes a Hall Effect sensor array 302. The HE sensor array 302 is provided with feature to fix itself within the housing 106.

The actuator 104 can be provided as stamped ferrous target with an encoded pattern 110 (i.e., as depicted in FIG. 1). A sheet of low-grade magnetic material with specified polarity can be attached to the back of the encoded metal sheet/ferrous target to serve as the actuator 104 according to a preferred embodiment. The ferrous target can be provided with an attachment component 112 that can attach on a user's actuator driver. Additionally, the ferrous target can be over-molded so that ferrous particles do not enter the punched slots 110 (i.e., as illustrated in FIG. 1) and/or so that the attachment to a user's actuator driver can be more detailed than that offered by a stamping process.

Figure 4:
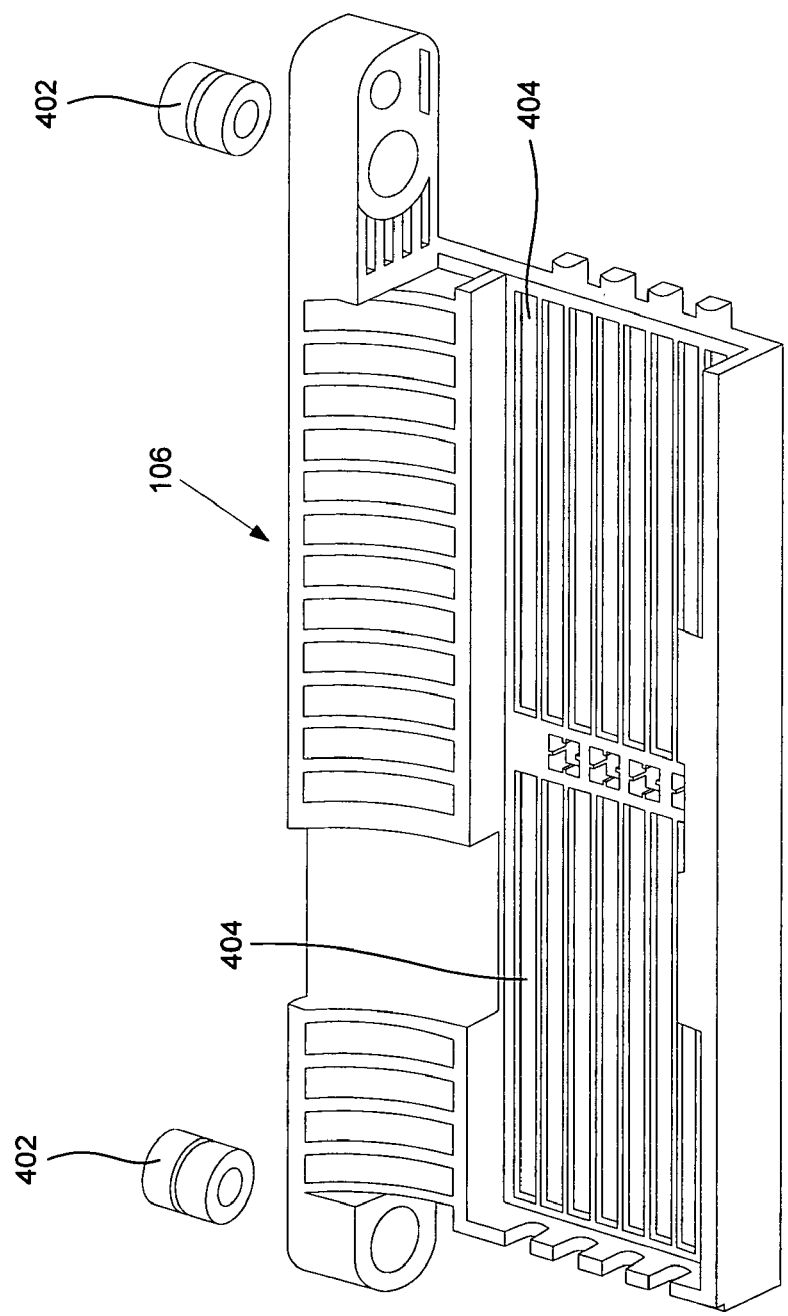
FIG. 4 illustrates a perspective view of a housing of the vane actuated magnetic drive mode sensor depicted in FIG. 3, in accordance with a preferred embodiment.

FIG. 4 illustrates a perspective view of a housing 106 of the vane actuated magnetic drive mode sensor 100 shown in FIG. 3, in accordance with a preferred embodiment. The housing 106 can be formed from a thermoplastic material and can contain two bushings 402 provided for attaching the housing 106 to a user's device. The housing 106 can also contain grooves 404 that allowing the actuator 104 (i.e., shown in FIG. 3) to slide within it. The actuator 104 may also slide externally within a fixed linear pattern.

Figure 5:
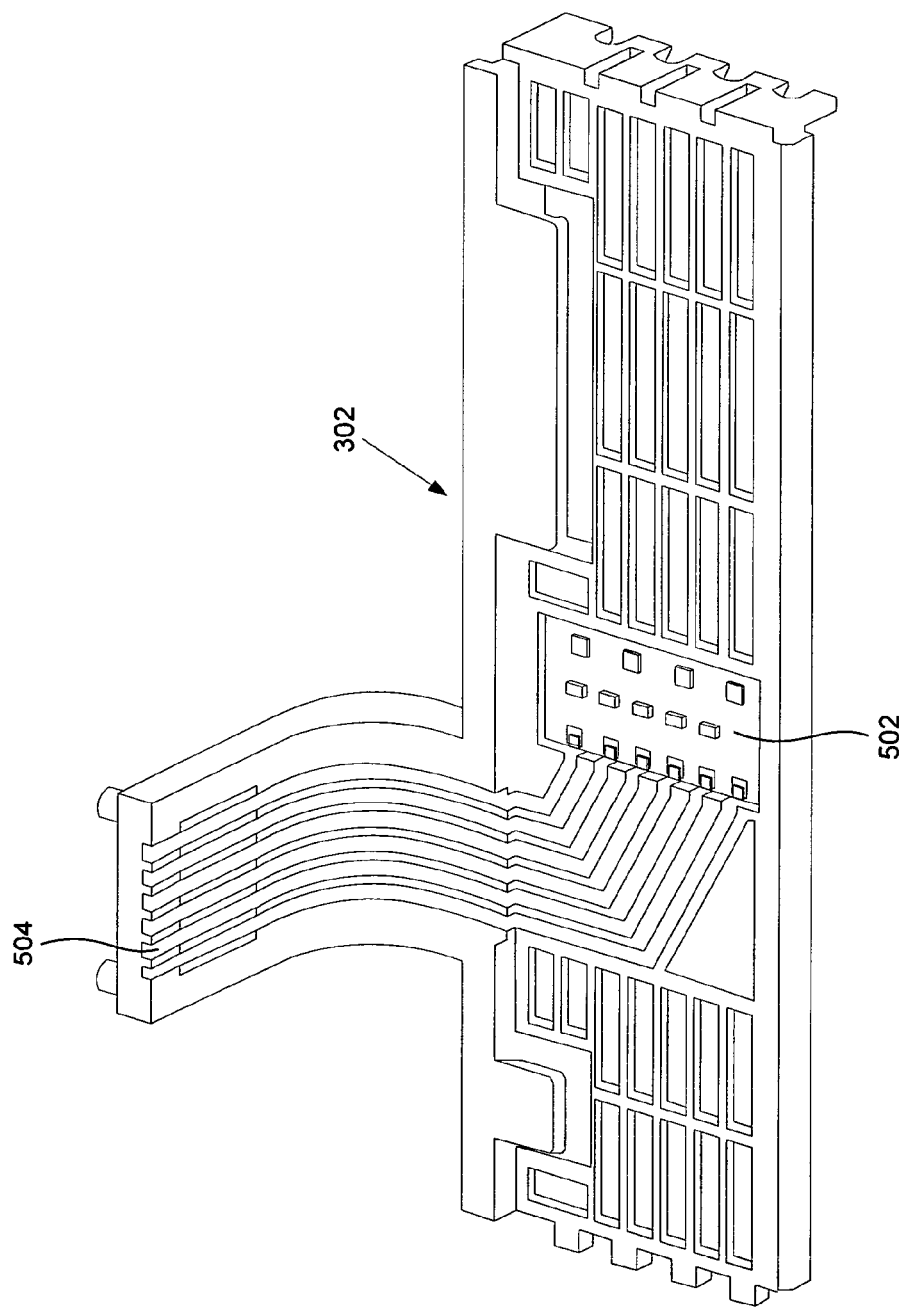
FIG. 5 illustrates the perspective view of the Hall effect sensor array of the vane actuated magnetic drive mode sensor of FIG. 3 in accordance with a preferred embodiment.

FIG. 5 illustrates a perspective view of a Hall Effect sensor array 302 of the vane actuated magnetic drive mode sensor 100 shown in FIG. 3, in accordance with a preferred embodiment. The Hall Effect sensor array 302 can be configured from a ceramic material and generally includes a PCB array 502, and at least one connector 504. A user may make contact to the terminals or at least one connector 504.

Figure 6:
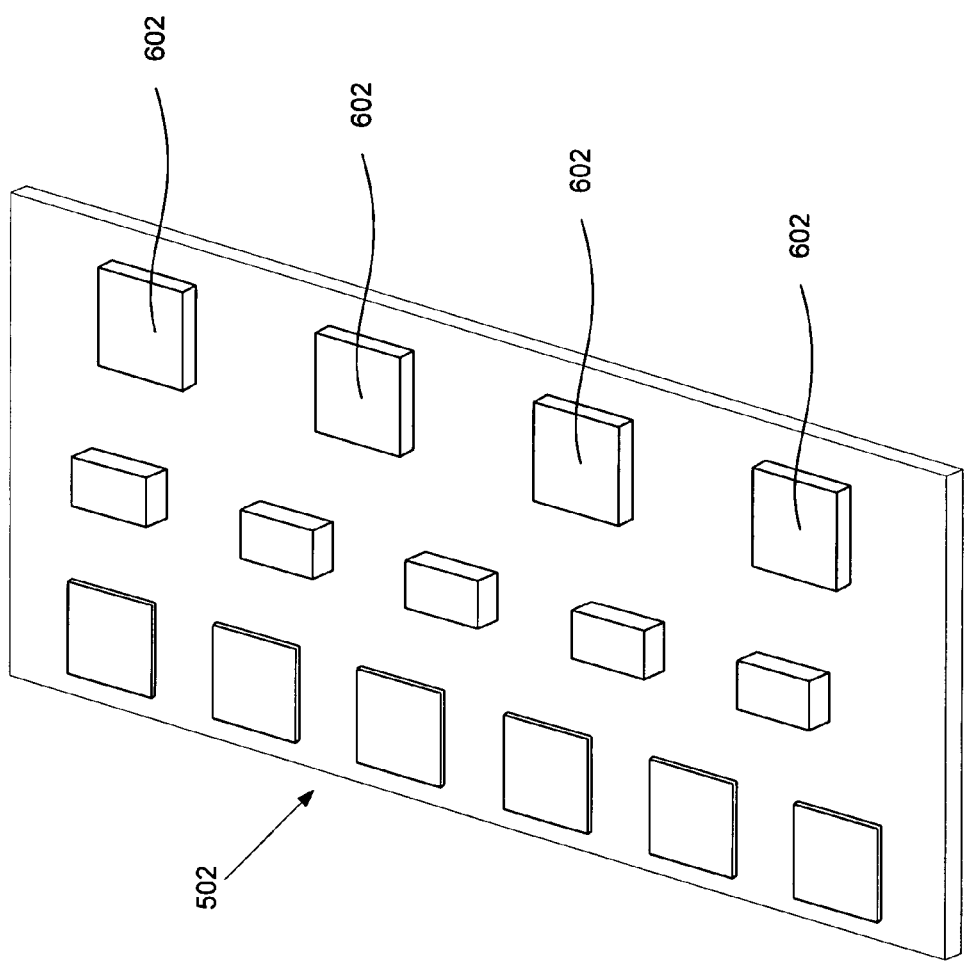
FIG. 6 illustrates the perspective view of the PCB array of the vane actuated magnetic drive mode sensor of FIG. 3 in accordance with a preferred embodiment.

FIG. 6 illustrates a perspective view of the PCB array 502 of the Hall sensor array 302 shown in FIG. 5, in accordance with a preferred embodiment. The PCB (printed circuit board) array 502 consists of at least one Hall Effect sensor 602 for sensing the actuator position.

As depicted in FIG. 1, the actuator 104 can be attached to a user's actuator driver using the attachment component 112. The magnets 108 are present to provide the magnetic field required for HE sensor actuation. Initially, all the HE sensors are in active state giving a certain output. When the actuator driver drives the actuator 104, it slides on the grooves (not shown in the figure) present in the housing 106. In this process the field between some of the magnets 108 and the HE sensors can be lost and all the sensors can then move into an inactive state. Thus, an output different to the one present initially is generated.

In some cases, punched slots come in between one or more sensors and magnets 108. When this occurs, the particular HE sensor/sensors remain active, and a different output is generated. The pattern of the punched slots 110 on the actuator 104 depends on the specific application and the output required for each step. The actuator 104 is over-molded so as to avoid any possible error in the output generated. If the actuator 104 is not over-molded there is a possibility that some ferrous particles may come between the magnet 108 and the HE sensor, thus blocking the magnetic flux and generating unwanted output.

In another embodiment of the invention, a low-grade magnetic material with a specific polarity may be attached to the back of the metal target. The metal target along with the magnetic material would serve as the actuator 304. The magnets need not be kept separately in the housing 306 and would thus be a more cost effective solution. Here also the metal target is over-molded to avoid erroneous output.

The two problems with the Hall sensor/encoded magnetic sensor described earlier, i.e. the difficulty in achieving desired accuracies (linear switch point accuracy) and high cost are therefore eliminated by using a "vane sensor" approach as described herein. A stamped piece of ferrous steel in the vane sensor substitutes for the large encoded magnet in 'encoded magnet solution', though all the other electronics in the vane sensor are same as that in encoded magnet solution.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vane actuated drive mode sensor apparatus, comprising:
a sensor array that includes a housing with at least one magnet to provide a magnetic field and at least one Hall effect sensor for sensing said magnetic field; and
an actuator attachable to an actuator driver, wherein said actuator comprises a ferrous steel actuator having a low grade magnetic material attached to a back of said ferrous steel actuator in order to bias said at least one Hall Effect sensor and provides a magnetic field for actuation of said at least one Hall Effect sensor, such that said sensor array and said housing are arranged with respect to one another to provide a vane actuated drive mode sensor apparatus and wherein said housing comprises a thermoplastic material to house said at least one magnet, said at least one Hall Effect sensor, and associated electronic components.

2. The apparatus of claim 1 wherein said at least one magnet is present on or within said housing to provide said magnetic field required for actuation of said vane actuated drive mode sensor apparatus.

3. The apparatus of claim 1 wherein said housing is configured with grooves for receiving said actuator.

4. The apparatus of claim 1 wherein said actuator slides externally within a fixed linear pattern within said housing.

5. The apparatus of claim 1 wherein said actuator is encoded with a punched pattern of slots.

6. The apparatus of claim 5 wherein said actuator is over-molded to restrict ferrous particles from entering said punched pattern of slots.

7. A vane actuated drive mode sensor apparatus, comprising:
a sensor array that includes a housing for maintaining at least one Hall Effect sensor; and
a ferrous steel actuator having a low grade magnetic material attached to a back of said ferrous steel actuator in order to bias said at least one Hall effect sensor and provide a magnetic field for actuation of said at least one Hall effect sensor, wherein said sensor array and said housing are arranged with respect to one another to provide a vane actuated drive mode sensor apparatus.

8. The apparatus of claim 7 wherein said housing comprises a thermoplastic material for housing a magnet, said at least one Hall Effect sensor, and associated electronic components.

9. The apparatus of claim 7 wherein said housing is configured with grooves for receiving said ferrous steel actuator.

10. The apparatus of claim 7 wherein said ferrous steel actuator slides externally within a fixed linear pattern within said housing.

11. The apparatus of claim 7 wherein said ferrous steel actuator is encoded with a punched pattern of slots.

12. The apparatus of claim 11 wherein said ferrous steel actuator is over-molded to restrict ferrous particles from entering said punched pattern of slots.

13. The apparatus of claim 7 wherein said ferrous steel actuator is provided with an attachment for attaching to an actuator driver.

14. A vane actuated drive mode sensor apparatus, comprising:
a thermoplastic housing configured with a plurality of grooves;
a ferrous steel actuator encoded with a printed pattern of slots, wherein said ferrous steel actuator slides within said plurality of grooves of said thermoplastic housing;
at least one Hall Effect sensor for sensing said magnetic field to detect a position of said ferrous steel actuator; and
at least one magnet provided in order to bias said at least one Hall effect sensor and to provide a magnetic field for actuation of said at least one Hall effect sensor, wherein said thermoplastic housing, said ferrous steel actuator and said at least one Hall effect sensor are arranged with respect to one another to provide a vane actuated drive mode sensor apparatus.

15. The apparatus of claim 14 wherein said at least one magnet is present on or within said thermoplastic housing to provide said magnetic field required for an actuation of said vane actuated drive mode sensor apparatus.

16. The apparatus of claim 14 wherein said ferrous steel actuator slides externally within a fixed linear pattern within said thermoplastic housing.

17. The apparatus of claim 14 wherein said ferrous steel actuator is encoded with a punched pattern of slots.

18. The apparatus of claim 17 wherein said ferrous steel actuator is over-molded to restrict ferrous particles from entering punched pattern of slots.

19. The apparatus of claim 17 wherein said ferrous steel actuator is provided with an attachment for attaching to an actuator driver.

20. The apparatus of claim 19 wherein said plurality grooves receive said ferrous steel actuator.

* * * * *